Figures 1, 2:
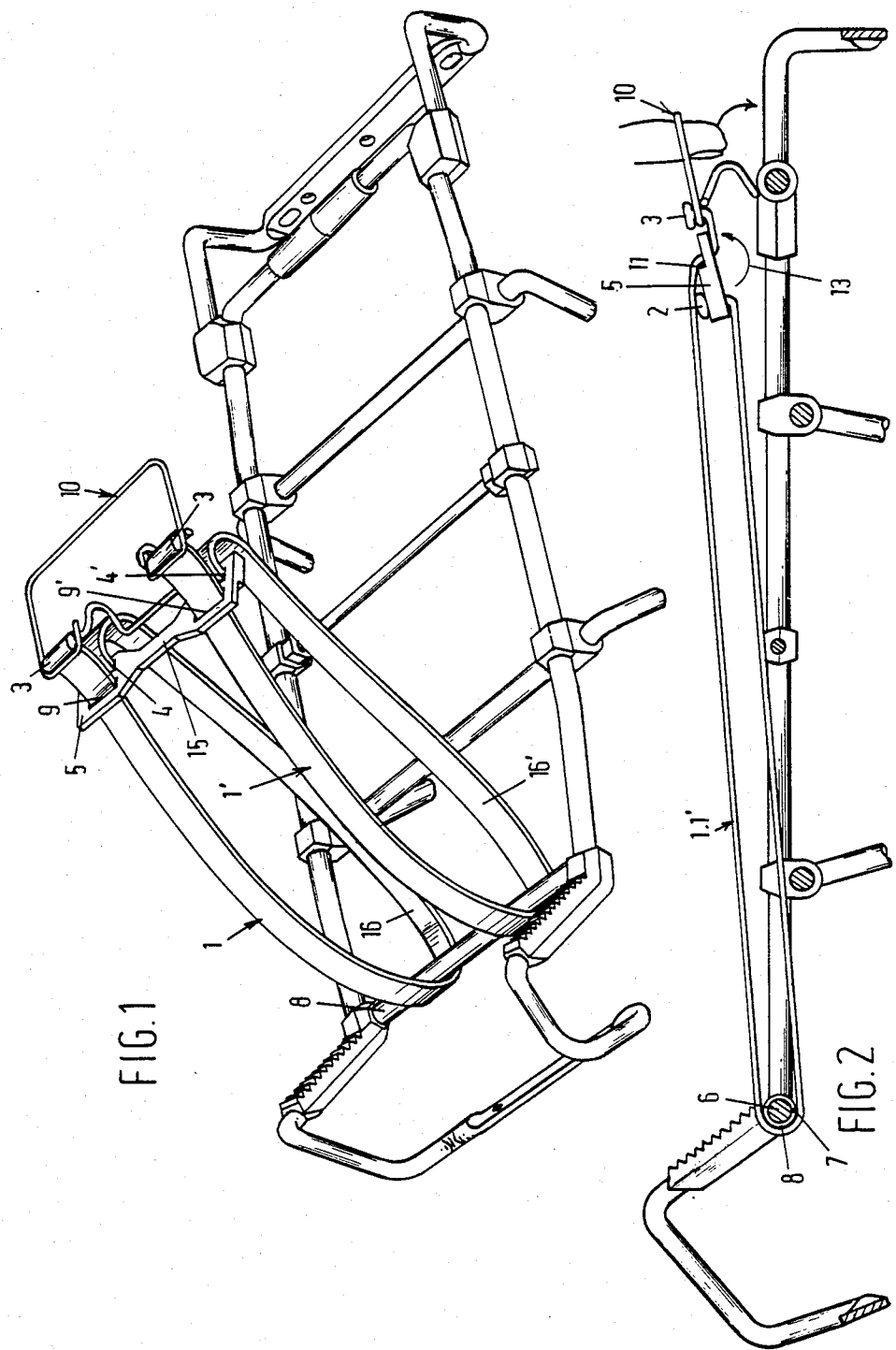

United States Patent [19]

Duyker et al.

[11] Patent Number: 4,494,684
[45] Date of Patent: Jan. 22, 1985

[54] LUGGAGE BINDER FOR A BICYCLE OR LIKE VEHICLE

[75] Inventors: Christiaan J. H. Duyker, MA Lisse; Albertus C. Balk, XL Aerdenhout, both of Netherlands

[73] Assignee: Bibia Rubber B.V., Netherlands

[21] Appl. No.: 396,834

[22] Filed: Jul. 9, 1982

[30] Foreign Application Priority Data

Jul. 14, 1981 [NL] Netherlands .......................... 8103347

[51] Int. Cl.³ .............................................. B62J 7/08
[52] U.S. Cl. .................................. 224/39; 280/289 A
[58] Field of Search ................ 224/30 R, 30 A, 32 R, 224/32 A, 37, 38, 39, 42; 280/289 A; 24/71 ST, 16 R, 17 A, 68 R, 68 CD, 136 K, 69 TT, 169, 115 H, 115 M, 181

[56] References Cited

U.S. PATENT DOCUMENTS 1,678,264  7/1928  Moore et al. .......................... 24/169
3,910,471 10/1975  Niemann ................................ 224/39

FOREIGN PATENT DOCUMENTS 509697   3/1956  Fed. Rep. of Germany ........ 224/39
1181083 11/1964  Fed. Rep. of Germany .
2229602 12/1974  France .............................. 224/39 R
49544 11/1940  Netherlands ...................... 224/39 R
6614593  4/1968  Netherlands .......................... 224/39
1138737  1/1969  United Kingdom ............. 24/71 ST Primary Examiner—Stephen Marcus
Assistant Examiner—Robert Petrik
Attorney, Agent, or Firm—Roylance, Abrams, Berdo & Goodman

[57] ABSTRACT

A luggage binder for a bicycle, comprising at least one elastic band 1 having two enlarged ends, one of which being secured in a handgrip 10 and the other in a slot 4 of an adjusting clasp 5. The band 1, starting from the adjusting clasp 5, forms a loop and extends through a second slot 9 in the adjusting clasp 5 to the handgrip 10. The adjusting clasp 5 is tiltable about its longitudinal axis. In the normal or operating position, the adjusting clasp 5 is not slidable since the band 1 presses on the enlarged band end 2 in the clasp 5. By tilting the clasp 5, this pressure is removed and the clasp 5 is conveniently slidable for adjustment of the band length to the dimensions of the luggage.

10 Claims, 2 Drawing Figures

U.S. Patent   Jan. 22, 1985   4,494,684

LUGGAGE BINDER FOR A BICYCLE OR LIKE VEHICLE

The invention relates to a longitudinally adjustable luggage binder for a bicycle or like vehicle, essentially consisting of an elastic band one end of which is secured in an adjusting clasp by means of an enlarged portion engaging behind the edges of a slot disposed in the adjusting clasp, which band, after a loop has been formed about a bar of the luggage carrier, is conducted in such a way through the adjusting clasp that the enlarged portion is pressed and retained by the band against the adjusting clasp, while the other end of the band is attached to a hook member adapted to engage behind a part of the luggage carrier.

Such a luggage binder is known from DE AS No. 1,181,083. In this known luggage binder the band, after a loop has been formed about a bar of the luggage carrier, extends successively through two slots disposed before and after the enlarged portion in the adjusting clasp. For the purpose of extending or shortening the band, it has to be pushed through the clasp, which is inconvenient and time-consuming, especially when the band is under tension. Moreover, the clasp can be shifted only with two hands. This drawback is aggravated yet when the luggage binder is designed with two or more parallel bands. In the latter case, each band separately is to be pushed through the clasp.

It is an object of the invention to remove these drawbacks and to provide a luggage binder which is adjustable in a convenient and simple manner. This is achieved in that the band, after the loop has been formed about a bar of the carrier, is conducted through only one slot in the adjusting clasp, which slot, seen from the loop, is disposed beyond the enlarged portion. It has been suprisingly found that the band thus mounted when under tension does not slide in the adjusting clasp, while the adjustment is very convenient if the clasp is rotated about a quarter of a turn about an axis parallel to the plane through the band and perpendicular to the longitudinal direction thereof. The band thus is temporarily disengaged from the enlarged portion and the clamping effect is then eliminated.

In order to have a proper grip during the tilting on the adjusting clasp, this is preferably provided, at least on one side, with a hand or finger grip.

Preferably, the luggage binder is provided with two separate, narrowly interspaced bands. In this case, the two bands may be conducted through the same adjusting clasp, while the portion of the clasp between the bands forms a hand or finger grip.

The luggage carrier bar about which the binder bands form a loop is provided, for the purpose of reducing friction, with a rotary roller of smooth synthetic plastics material, in the form of a synthetic plastics tube severed lengthwise.

One embodiment of the luggage binder according to the invention will now be described, by way of example, with reference to the accompanying drawing, in which:

FIG. 1 is a perspective view of a luggage carrier for a bicycle provided with a binder according to the invention; and FIG. 2 is a longitudinal median cross-section through the luggage carrier shown in FIG. 1.

The luggage binder comprises two identical elastic bands 1,1', which each at both ends are provided with enlarged portions 2,3. The portion 2 engages behind the edges of the slot 4 in the adjusting clasp 5. The bands 1,1' make loops 16,16' about the carrier bar 6, which is surrounded, with clearance, by a tube 8 of smooth, synthetic plastics severed lengthwise at 7 and then project through the slots 9,9' in the clasp 5. The bands ends are connected to a hook member 10, which is adapted to engage behind a cross bar of the luggage carrier.

For the purpose of conveniently inserting the enlarged portions 2,3 in the slots of the clasp, said slots are locally widened, as known per se from Dutch Pat. No. 154,969.

The distance between the two slots 4 and 9 in the adjusting clasp 5, in relation with the dimensions of the enlarged portion 2, is chosen in such a manner that the tensioned band 1 extends with a bend 11 over an edge of the enlarged portion 2. As a result, the enlarged portion 2 is pressed against the adjusting clasp 5 with a force that depends on the band tension and the angle of the bend. The large coefficient of friction between the band 1 and the enlarged portion 2, which indeed both consist of the same rough material, e.g. rubber, prevents, in case the bands are tensioned, the bands 1,1' from sliding through the adjusting clasp 5.

The adjustment of the band length, e.g. to the size of the luggage, however, can take place very simply, after the adjusting clasp 5, which can be conveniently engaged at the central portion 15, has been tilted by hand about a quarter of a turn in the direction of the arrow 13 about the longitudinal axis of the clasp 5. As a result, the bend 11 is removed and the clasp 5 extends perpendicular to the bands 1,1'. The bands 1,1' can then slide through the slots 9,9' practically without resistance. This sliding is further simplified in that the bar 6 of the luggage carrier, about which the bands 1,1' with the loops 16,16' are conducted, is fitted with a roller 8 of smooth, elastic plastics material, which fits with clearance on the bar 6 and rotates during the sliding of the bands 1,1' through the clasp 5. The roller 8 can be mounted on the bar 6 by bending open the longitudinal section 7.

In the embodiment shown, the luggage binder 2 comprises two bands 1,1', which are conducted interspaced through the adjusting clasp 5. The clasp, for the purpose of its tilting, can be easily engaged in this case at the central portion 15. Naturally, if desired, also more than two bands may be used, which are all conducted interspaced through an adjusting clasp 5 adapted to this number of bands. Possibly, also a single band may suffice, in which case the adjusting clasp is preferably fitted with one or more laterally extending handgrips.

We claim:

1. In a longitudinally adjustable luggage binder for a vehicle luggage carrier having at least first and second bars, comprising an elastic band, one end of which passes through a first slot in an adjusting clasp and is secured thereto by means of an enlarged portion engaging the edges of the slot, the band, after a loop has been formed about a bar of the luggage carrier, being conducted through a second slot in the adjusting clasp so that the enlarged portion is pressed and retained by the band against the adjusting clasp, the other end of the band being attached to a hook member adapted to engage a part of the luggage carrier, characterized in that:

the band after the loop has been formed, is conducted through the second slot only in the adjusting clasp, which second slot, as seen from the loop, is disposed beyond the enlarged portion, and beyond the first slot by a fixed distance, such that between the loop and the hook member the band extends through only a single slot in the adjusting clasp, whereby the distance between said adjusting clasp and said hook member can be adjusted by merely rotating and sliding said clasp relative to said band.

2. A luggage binder according to claim 1, characterized in that the adjusting clasp, at least at one side, is provided with a handgrip by means of which the adjusting clasp can be rotated about an axis parallel to the plane through the band and perpendicular to the longitudinal direction thereof.

3. A luggage binder according to claim 1, characterized in that two separate bands are conducted with some interspace through the adjusting clasp.

4. A luggage binder according to claim 1, characterized in that two separate bands are conducted with some interspace through the adjusting clasp and a portion of the adjusting clasp disposed between said two bands forms a handgrip.

5. A longitudinally adjustable luggage binder for a vehicle luggage carrier, the carrier having at least first and second space bars, the combination comprising:

an adjusting clasp having a first surface and a second surface with first and second slots extending between said surfaces and being aligned and fixedly spaced along said adjusting clasp;

a hook member adapted to engage a bar on the luggage carrier;

an elastic band having an enlarged first end, which is larger than said first slot, and a second end, said enlarged first end engaging said first surface on said adjusting clasp, said band extending from said enlarged first end, through said first slot into a loop around the first bar, over said enlarged first end, and then through said second slot only from said first surface towards said second surface such that between the loop and said hook member said band extends through only a single slot in said adjusting clasp; and means for coupling said elastic band second end to said hook member after said band has extended through said second slot, whereby said hook member can engage the second bar to hold luggage between said band and the luggage carrier, the distance between said adjusting clasp and said hook member being fixed, when said band is tensioned, via engagement of said enlarged first end with said band, and the distance between said adjusting clasp and said hook member being adjustable merely by rotating and sliding said clasp relative to said band.

6. A luggage binder according to claim 5, and further comprising third and fourth slots extending between said first and second surfaces in said adjusting clasp and being aligned and fixedly spaced along said adjusting clasp;

a second elastic band having an enlarged first end, which is larger than said third slot, and a second end, said enlarged first end on said second elastic band engaging said first surface on said adjusting clasp, said second elastic band extending from said enlarged first end thereon, through said third slot into a loop around the first bar, over said enlarged first end thereon, and then through only said fourth slot from said first surface towards said second surface; and means for coupling said second elastic band second end to said hook member after said second elastic band has extended through said fourth slot.

7. A luggage binder according to claim 6, and further comprising means, located on said adjusting clasp between said first and second elastic bands, for defining a handgrip.

8. A luggage binder according to claim 5, and further comprising means, located on said adjusting clasp, for defining a handgrip.

9. A luggage binder according to claim 5, wherein said adjusting clasp is wider between said first and second surfaces adjacent said first slot than it is adjacent said second slot.

10. A longitudinally adjustable luggage binder for a vehicle luggage carrier, the combination comprising:

an adjusting clasp having a first surface and a second surface with first and second slots extending between said surfaces and being aligned and fixedly spaced along said adjusting clasp;

a hook member;

an elastic band having an enlarged first end, which is larger than said first slot, and a second end, said enlarged first end engaging said first surface on said adjusting clasp, said band extending from said enlarged first end, through said first slot into a loop, over said enlarged first end, and then through said second slot only from said first surface towards said second surface such that between said loop and said hook member said band extends through only a single slot in said adjusting clasp; and means for coupling said elastic band second end to said hook member after said band has extended through said second slot, the distance between said adjusting clasp and said hook member being fixed, when said band is tensioned, via engagement of said enlarged first end with said band, and the distance between said adjusting clasp and said hook member being adjustable merely by rotating and sliding said clasp relative to band.

* * * * *